Jan. 19, 1965     L. A. HADDOCK, JR     3,166,209
FORKLIFT TRUCK WITH FORKS THAT ARE PIVOTED ABOUT
A VERTICAL AXIS BY LATERAL MOVEMENT
OF THE FORK ASSEMBLY CARRIAGES
Filed July 27, 1961     6 Sheets-Sheet 1

FIG. 1

INVENTOR
LOUIS A. HADDOCK JR.
BY
ATTORNEY

Jan. 19, 1965    L. A. HADDOCK, JR    3,166,209
FORKLIFT TRUCK WITH FORKS THAT ARE PIVOTED ABOUT
A VERTICAL AXIS BY LATERAL MOVEMENT
OF THE FORK ASSEMBLY CARRIAGES
Filed July 27, 1961    6 Sheets-Sheet 3

*INVENTOR*
LOUIS A. HADDOCK JR.
BY
ATTORNEY

Jan. 19, 1965 L. A. HADDOCK, JR 3,166,209
FORKLIFT TRUCK WITH FORKS THAT ARE PIVOTED ABOUT
A VERTICAL AXIS BY LATERAL MOVEMENT
OF THE FORK ASSEMBLY CARRIAGES
Filed July 27, 1961 6 Sheets-Sheet 4

INVENTOR
LOUIS A. HADDOCK JR.
BY
ATTORNEY

FIG. 8

United States Patent Office 3,166,209
Patented Jan. 19, 1965

3,166,209
FORKLIFT TRUCK WITH FORKS THAT ARE PIVOTED ABOUT A VERTICAL AXIS BY LATERAL MOVEMENT OF THE FORK ASSEMBLY CARRIAGES
Louis A. Haddock, Jr., Battle Creek, Mich., assignor to Clark Equipment Company, a corporation of Michigan
Filed July 27, 1961, Ser. No. 127,273
7 Claims. (Cl. 214—730)

This invention relates to a universal loader mechanism for use with industrial lift trucks and the like, and more particularly to improved positional control means for a universal loader mechanism.

Heretofore, much difficulty and inconvenience has been encountered in the use of industrial trucks, for example, in narrow aisles formed between vertical stacks of materials and in other close quarters, such as is commonly found in warehouses, due to the fact that a lift truck normally must approach a load to be transported approximately at right angles thereto, so that between two rows of stacks there must be provided a relatively wide passage in order to make it possible for the truck to approach the load.

This invention constitutes an improvement over the inventions disclosed and claimed in Patents Nos. 2,945,610 (issued in the name of Herman Wendt on July 19, 1960) and 2,950,831 (issued in the name of Janis O. Anzons on August 30, 1960), both assigned to the assignee of the present invention. The aforementioned Wendt patent discloses an extremely significant contribution to the art wherein industrial vehicles may be employed to accomplish useful work by utilizing a semi-universal load carrier means capable of engaging a load either in front of or at either side of a truck or at any angle therebetween. After a load is engaged, it may be actuated to any desired position ahead of or at either side of the truck.

The Anzons patent discloses control mechanism for load carrier means which provides for not only all load carrier movements of which the Wendt mechanism is capable, but also provides for movement of the load carrier from a forwardly directed position to a position at either side of the truck without extension of the load carrier beyond the lateral dimension of the truck. In other words, a load carrier may be controlled by means of the Anzons invention to move from a forwardly directed position to a position at one side of the truck without swinging out beyond that side of the truck in executing such movement.

The present invention improves upon both of the prior constructions by providing control and actuating mechanism for load carriers which permits the load carrier when in position to engage the load forwardly thereof, to be side shifted transversely in either direction from a central position, and then to be swung from said forwardly directed position to a position at either side of the truck without extension of the load carrier beyond the lateral dimension of the truck.

It is a principal object of the present invention to provide positional control means for load carriers of the type specified which is actuated upon load carrier movement in a direction transverse to a forward load engaging position of the load carrier.

Another object of my invention is to provide improved load engaging means for attachment to a vehicle for movement transversely of the vehicle while located for engaging loads forwardly of the vehicle, for swinging movement to a side load engaging position wherein loads at that side of the vehicle may be engaged, and for movement transverse of the vehicle while located in said side load engaging position.

Another object of the invention is to provide control means for load carriers of the type specified which is operable to control transverse movements of the load carrier both from a forward and a side load engaging position of the load carrier, and to control the movement of the load carrier from a forward to a side load engaging position.

A general object of the invention is to provide improved position control means for load carriers of the type specified.

Other objects, features and advantages of my invention will become apparent from the following detailed description when taken in conjunction with the accompanying drawings wherein.

Figure 1:
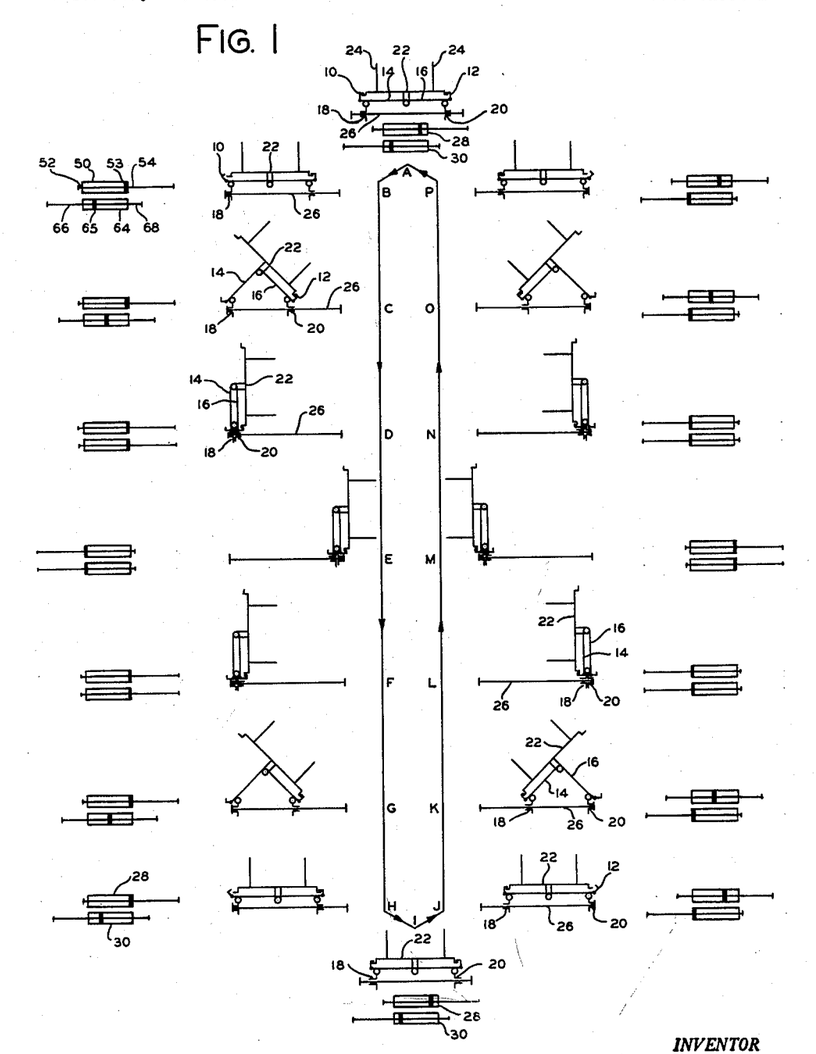
FIGURE 1 diagrammatically illustrates my device in various positional phases of its available mode of operation.

Referring now in detail to the drawings, principal movements of my device are shown in FIGURE 1, wherein arrow lines between various movement phases (A–H–I and I–P–A) indicate two possible movement combinations. In order to execute the indicated movements, certain movable parts of my device must be latched to certain other movable parts. Means for latching these parts together are indicated diagrammatically in FIGURE 1 at numerals 10 and 12; the construction of the latching means will be described in full further on in the description. The over-all arrangement consists of two levers 14 and 16 which are hinged together at adjacent ends thereof, and the free ends of which are hinged to guide members 18 and 20 at 164 and 172 by plates 160 and 168 respectively. A load carrier or load engaging means 22 is hinged to the common joint of levers 14 and 16 and is adapted to swing horizontally. As illustrated, the load carrier comprises the usual pair of fork tines 24 which are secured to the carriage 22 in a known manner. All movements of the carriage 22 are executed as a result of movement of one or both guide members 18 and 20 along a guide track 26. To facilitate understanding, there is diagrammatically illustrated adjacent each of the movement phases shown in FIGURE 1 a pair of hydraulic cylinder and piston assemblies 28 and 30, the cylinder of each of which is, in fact, fixedly secured relative to guide track 26 and the piston rods of which are operatively connected to opposite ones of guide members 18 and 20 for the purpose of actuating along the guide track 26 one or the other or both of the said guide members in a manner to be described.

Phase A of FIGURE 1 represents the load carrier's basic position on a lift truck, wherein the truck and load carrier can function in the usual manner. If guide members 18 and 20 are simultaneously actuated to the left to the position in Phase B, latch means 10 will be caused to release the adjacent end of carriage 22 from the adjacent end of lever 14. Such movement of guide members 18 and 20 results from actuation of cylinder assemblies 28 and 30 toward the right side of the truck. Continued movement of guide member 20 by actuation of piston and cylinder assembly 30 causes the carriage 22 to pass through the position illustrated in Phase C to the position shown in Phase D. The carriage 22 and levers 14 and 16 may now be moved together transversely to the right side of the truck by simultaneously actuating the piston and cylinder assemblies 28 and 30 as in Phase E, in which position a load may be engaged by the fork tines 24 and then moved toward the left side of the truck by actuating the cylinders together in the opposite direction as shown in Phase F. From the Phase F position the carriage 22 may be returned to its basic position (Phase I) via Phases G and H. Deposit of the load adjacent the side of the truck opposite to that at which it was engaged may be accomplished by shifting carriage 22 to the right by means of piston and cylinder assemblies 28 and 30 to unlatch latch means 20 (Phase J), subsequent to which the piston and cylinder assemblies 28 and 30 may be energized in the sequence illustrated in Phases K–L–M. From the unloading position of Phase M the load carrier may again be returned to its basic position A via Phases N–O–P. The approximate relative position of each movable piston and double piston rod associated with cylinder assemblies 28 and 30 is illustrated for each phase position shown in FIGURE 1.

A principal advantage of my invention lies in the fact that a limited amount of side shifting of either side of the truck with the carriage and fork tines in a forward load engaging position is available prior to unlatching the carriage. In actual practice the amount of side shift available prior to unlatching is approximately 4" to either side of center. This side shifting movement is not possible with the device of either of the aforementioned patents. It will be appreciated that it is extremely advantageous to be able to position the fork tines by side shifting in order to readily and efficiently align the fork tines for engaging a load. Alternatively, it is necessary to maneuver the lift truck to thus align the fork tines which is, of course, more time-consuming and tiring for the operator. Side shifting devices per se are well-known in the art, but have not heretofore been known in combination with side loader devices.

Figure 2:
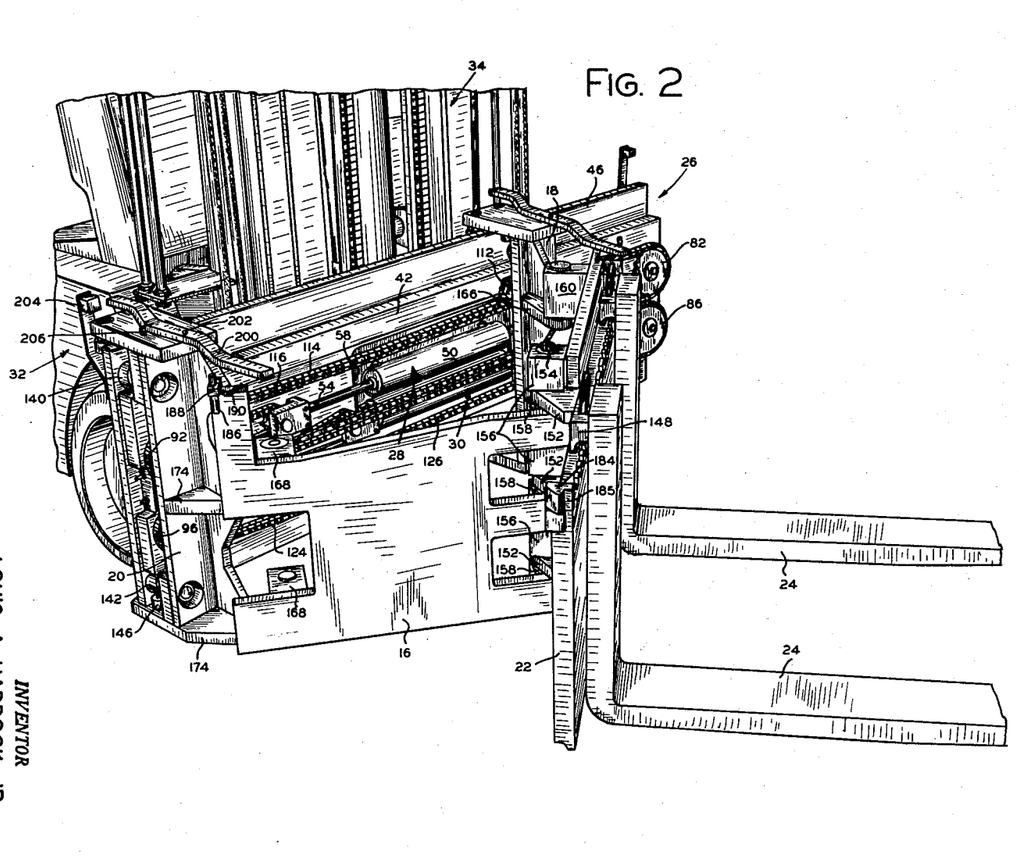
FIGURE 2 is a perspective view of my device attached to a lift truck and shown intermediate a forward and side loading position.

Referring now to FIGURE 2, I have indicated generally the forward portion of an industrial lift truck at numeral 32. My invention is well-adapted for use with such a vehicle, although I do not intend that it be limited to any such particular use. Other uses will occur to persons skilled in the art. This vehicle is of a well-known type and includes a vertically disposed telescopic mast structure 34. My device is supported upon a pair of upper and lower transversely extending and vertically spaced fork bars 36 and 38, respectively, (FIGURE 6) which are mounted for vertical movement within the inner slide structure of mast 34 by means of a pair of rearwardly extending and transversely spaced brackets 40 (only one of which is shown) which are mounted in I-beam members of the mast structure by means of a plurality of roller assemblies (not shown). The mast structure and the means for mounting my invention therein are known and do not comprise a part of my invention; this structure need not, therefore be described further herein. Details of the mast construction and fork mounting means are fully disclosed in U.S. Patent No. 2,906,373, issued in the names of Hastings and Backofen on September 29, 1959 (common assignee).

The basic concept of this invention has already been described in connection with FIGURE 1. The load carrier 22, 24 is mounted about a vertical hinge or pivot connection of two levers 14, 16 which can swing horizontally on a hinge, the opposite ends of the levers being movable horizontally in any desired sequence on guide members which are movable transversely of a vehicle, and the load carrier being latchable as desired to either one or both of the levers.

Referring now to FIGURES 2 through 8, the guide track means 26 comprises a pair of vertically spaced bar members 42 and 44 extending transversely of the truck and secured, as by welding, to a rectangular plate 46. Secured to the other side of plate 46 is a horizontally extending hook member 48 which engages the upper fork bar 36 to mount my device upon mast structure 34. Also, plate 46 is held in fixed relation upon fork bar 36 by a pair of laterally spaced machine screws 49 (one of which is shown) which pass through fork bar) 38 and threadably engage plate 46.

The piston and cylinder assembly 28 comprises a fixed cylinder 50 and a pair of reciprocal piston rods 52 and 54 extending from opposite ends of cylinder 50 and connected to opposite sides of a piston head 53 (FIG. 1). Cylinder 50 has a pair of lugs 56 extending rearwardly from the side wall in transversely spaced relation and through an opening 58 in mounting plate 46. These lugs serve to mount cylinder assembly 28 by means of bolts 62 on a support bar 60 which extends transversely of opening 58, FIG. 8, intermediate of fork bars 36 and 38 and is fixed to the rear side of plate 46 as by welding. Similarly, cylinder assembly 30 comprises a fixed cylinder 64 mounted in the same manner as cylinder 50, and a pair of oppositely extending piston rods 66 and 68 connected to opposite sides of a piston head 65 (FIG. 1). Cylinder assembly 30 is located vertically beneath assembly 28 and is connected to the lower side of support bar 60 by means of a pair of lugs 70 which extend from the cylinder side wall and are secured to said support bar 60 by bolts 72.

The hydraulic system for controlling the position and movements of the piston and piston rods in the cylinders, as best shown in FIGURE 1, comprises a plurality of hydraulic conduits connected at the one ends thereof to opposite ends of cylinders 50 and 64, respectively, and at the other ends thereof to suitable valve means having a valve control preferably located conveniently on the lift truck for selectively placing said other ends of the conduits either in communication with a fluid pressurizing pump or with a reservoir to which the pump is connected. Inasmuch as the valve control system for cylinders 50 and 64 is not a part of this invention it has not been illustrated herein.

Figure 6:
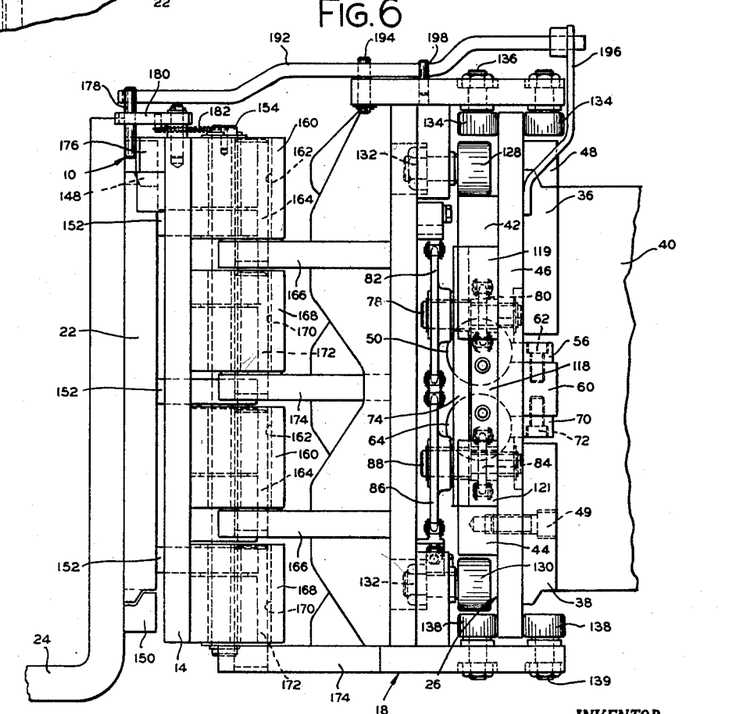
FIGURE 6 is a side elevation of the device as shown in FIGURE 3.
Figure 7:
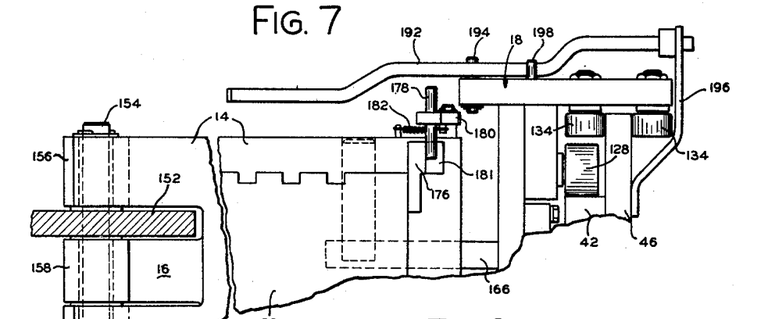
FIGURE 7 is a fragmentary side elevational view of the device as shown in FIGURE 6, but with the load engaging means located in a side load engaging position.
Figure 8:
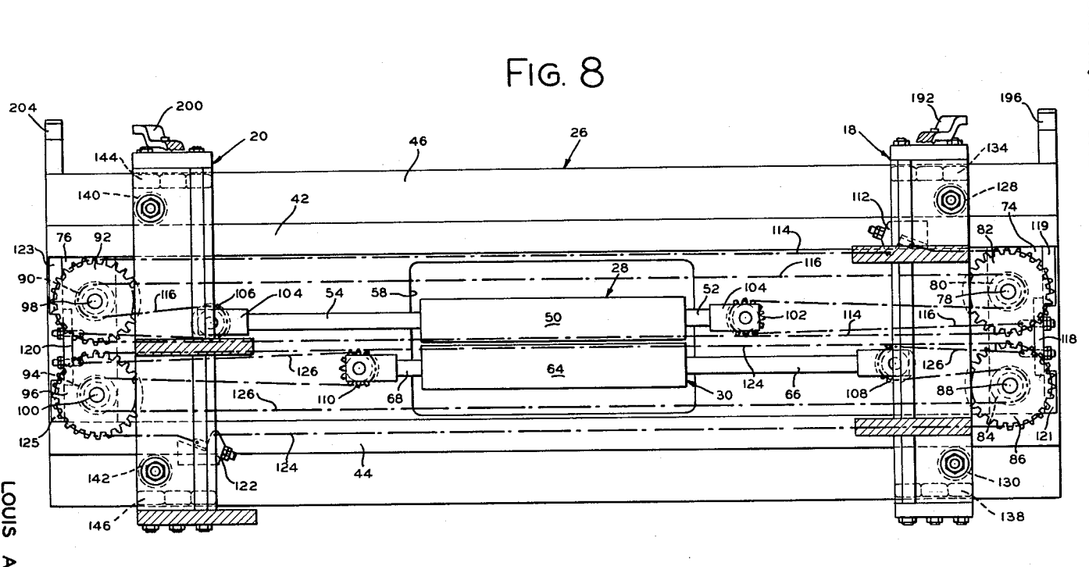
FIGURE 8 is a somewhat schematized view taken along line 8—8 of FIG. 3.
Figure 9:
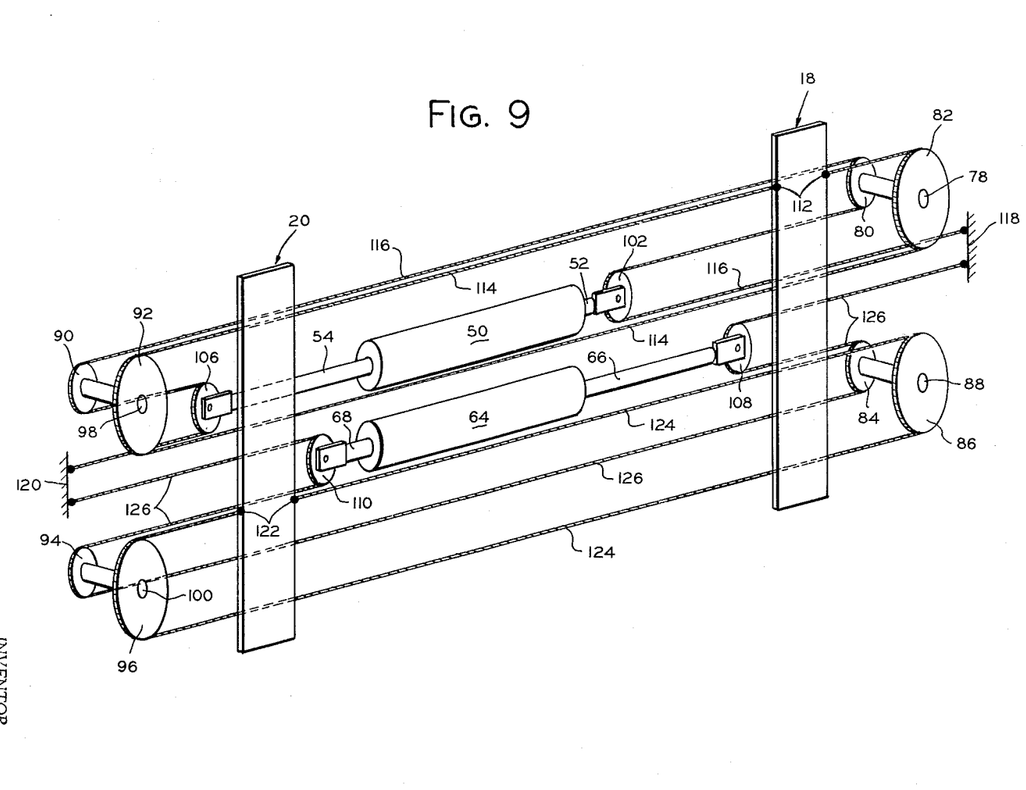
FIGURE 9 is a perspective schematized view which shows the reeving of my invention to better advantage.

Referring now especially to FIGURES 6 and 8, a pair of vertically extending and transversely spaced plates 74 and 76 are secured to bar members 42 and 44 adjacent opposite ends thereof and in parallel forwardly spaced relation from plate 46. Plates 46 and 74 together support for rotation a pair of vertically spaced sprocket or wheel shafts 78 and 88 upon which are mounted for rotation pairs of sprockets or wheels. Shaft 78 supports relatively small sprocket 80 intermediate plates 46 and 74 and relatively large sproket 82 (approximately twice the diameter of sprocket 80) forwardly of plate 74. Shaft 88 supports in like manner relatively small sprocket 84 and relatively large sprocket 86. Likewise, plates 46 and 76 journal for rotation a pair of vertically spaced shafts 98 and 100 upon which are mounted in similar manner like pairs of sprockets or wheels 90, 92 and 94, 96, respectively. Sprockets or wheels 102 and 106, preferably of a diameter equal to the diameter of the aforementioned relatively small sprockets, are mounted for rotation by means of yoke and shaft assemblies 104 at the outer ends of rods 52 and 54, respectively, and equal diameter sprockets or wheels 108 and 110 are similarly mounted at the respective outer ends of piston rods 66 and 68.

The above-mentioned sprockets or wheels are operatively interconnected in the following manner. An anchor member 112 is secured to guide member 18, as shown. A sprocket chain 114 is secured at each end to anchor member 112 and reeved over sprockets 82 and 92. Another sprocket chain or cable 116 is secured at one end to an anchor plate 118 which is attached to plate member 46 by plates 119 and 121, and is reeved in succession over sprockets 102, 80, 90 and 106. The other end of chain 116 is secured to an anchor plate 120 which is also attached to plate member 46 by plates 123 and 125. The above-described sprocket and chain arrangement operatively connects piston rod and cylinder assembly 28 with guide member 18 in such a manner that movement of piston rods 52 and 54 in one direction results in movement of guide member 18 in the opposite direction at a rate equal to four times that of the piston rods as a result of the 2:1 diameter ratio of sprocket sets 80, 82 and 90, 92 and the double strand of chain reeved over piston rod sprockets 102 and 106. The lower sprocket sets, cylinder assembly 64 and guide member 20 are similarly connected together. An anchor member 122 secures both ends of a sprocket chain or cable 124 to guide member 20. Chain 124 is reeved over sprockets 86 and 96 as shown. Another sprocket chain or cable 126 is reeved over sprockets 108, 84, 94 and 110 and is secured at opposite ends thereof to anchor plates 118 and 120 in the same manner as described above in regard to chain 116. Guide member 20 is actuated by the latter cylinder, chain and sprocket assembly in the same manner as described above in connection with the actuation of guide member 18.

Guide members 18 and 20 extend forwardly to guide track 26 and are each mounted for rolling engagement therewith during movement of one or both guide members transversely of the truck. The guide member 18, for example, is mounted upon guide track 26 by means of upper and lower rollers 128 and 130 having horizontally extending stub shafts 132 secured to the generally U-shaped guide member 18 so that the rollers engage the outer sides of bar members 42 and 44. In addition, an upper group of three rollers 134 is connected by vertically extending stub shafts 136 to the upper leg portion of member 18 for rolling engagement with the vertical sides of plate 46; two of the rollers 134 are transversely spaced and in contact with the rear side of plate 46 and the remaining one is in contact with the front side of plate 46 transversely intermediate the other two. A lower group of three rollers 138 is connected by vertically extending stub shafts 139 to the lower leg portion of member 18 for rolling engagement with the vertical sides of plate 46 in a manner similar to rollers 134, except that two rollers contact the front side and one roller the rear side of plate 46. Guide member 20 is similarly connected to the guide track by means of rollers 140 and 142 and roller groups 144 and 146. The rollers 128 and 130 of guide member 18 and the corresponding rollers of guide member 20 react with bar members 42 and 44 to resist downward thrust, as well as torque in a vertical plane which results from an off-center load upon the fork tines 24, while rollers 134 and 138 of guide member 18 and the corresponding rollers of guide member 20 react with plate 46 to resist longitudinally directed thrust, as well as torque in a horizontal plane.

Figure 3:
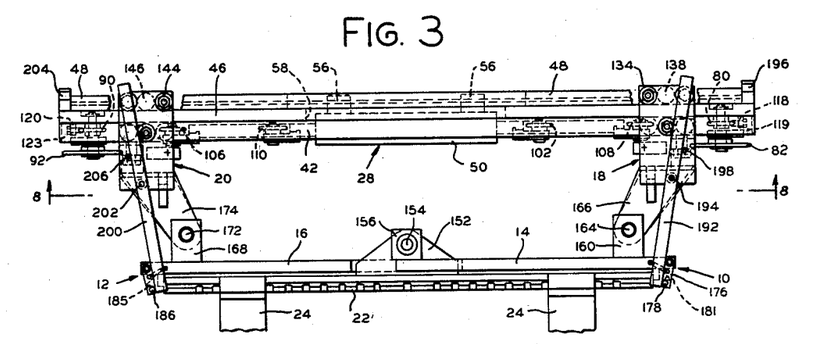
FIGURE 3 is a plan view of my device in a centered forward load engaging position with actuating chains removed to increase clarity.

The fork tines 24 are L-shaped for engaging loads in a well-known manner and are connected to carrier plate 22 by means of upper and lower brackets 148 and 150. The fork tines 24 are laterally adjustable along the plate 22 by means which is disclosed in detail in U.S. Patent No. 2,847,138, issued in the names of Backofen and Newhouse on August 12, 1958 (common assignee). Extending rearwardly from the central portion of carrier plate 22 is a group of three vertically spaced and generally triangularly shaped bracket members 152 having vertically aligned openings for the reception of a vertically extending hinge pin 154. The hinge pin 154 also serves to join the pivoted levers or hinge plates 14 and 16 at one end in pivotal relation one to the other. A group of three rearwardly extending hinge blocks 156, FIG. 3, are secured to hinge plate 14 in vertically spaced relation and a group of three hinge blocks 158, FIG. 2, extend rearwardly from hinge plate 16 in like spaced relation, blocks 156 and 158 having vertically aligned openings therein for reception of hinge pin 154 and being located alternately on the respective hinge plates 14 and 16 to provide with pin 154 a hinge connection.

Secured to the other end of hinge plate 14 is a pair of rearwardly extending vertically spaced hinge blocks 160 having vertically aligned openings 162 therein. Hinge blocks 160 are mounted for pivotal movement on a pair of upwardly extending and vertically spaced pins 164 secured to a pair of forwardly extending vertically spaced plates 166 which are secured to the vertical base portion of guide member 18 to form a hinged connection between hinge plate 14 and guide member 18. Hinge plate 16 is similarly secured to guide member 20 by means of a pair of vertically spaced hinge blocks 168 having vertically aligned openings 170 therein which cooperate with a pair of upwardly extending vertically aligned pivot pins 172 secured to a pair of forwardly extending vertically spaced plates 174 secured to guide member 20. It will be appreciated that the vertical spacing of blocks 160 and 168 permits interengagement between the pivoted ends of hinge members 14 and 16 when the levers have an angular relationship of zero degrees, whereby the levers 14 and 16 together form a forwardly extending boom relative to the truck.

Latch means 10 comprises a latch block 176 fixedly secured to carrier plate 22 at one of the upper corners thereof and a vertically disposed pin 178 secured adjacent one end of a bar 180 which is pivotally connected at the other end thereof to hinge plate 14 to swing about a vertical axis. The pin and bar assembly 178, 180 is normally held in registry with a notch 181 of latch block 176 by means of a spring 182 attached at one end to the assembly and at the other end to hinge plate 14. The pin 178 serves to engage latch block 176 and hold carrier plate 22 and hinge plate 14, in fixed relation. The latch means 12 is similarly constructed and comprises a latch block 184 having a notch 185, a vertically disposed pin 186, a bar 188 and a spring 190.

A forwardly extending trip lever 192 is pivotally connected to the upper leg portion of guide member 18 by means of pivot pin 194. One end of trip lever 192 is engageable with latch pin 178 and the other end is engageable with a stop member 196 secured to plate 46 as shown. There also is provided a stop pin 198 which serves to hold trip lever 192 in abutting relation with latch pin 178 when the device is disposed, for example, as shown in FIGURE 3. Another trip lever 200 is secured to guide member 20 by means of a pin 202 and cooperates in a similar manner with a stop member 204 and a stop pin 206.

In operation, a driver may control the truck to approch a load which is located either axially of the truck, longitudinally of the truck but out of axial alignment therewith laterally to one or the other sides of the truck, or at any angle between forward and lateral load positions, and by suitable control of piston and cylinder assemblies 28 and 30, position the fork tines 24 to engage a load in any of the above positions and thereafter transport same for deposit in any such position relative to the truck.

Figure 4:
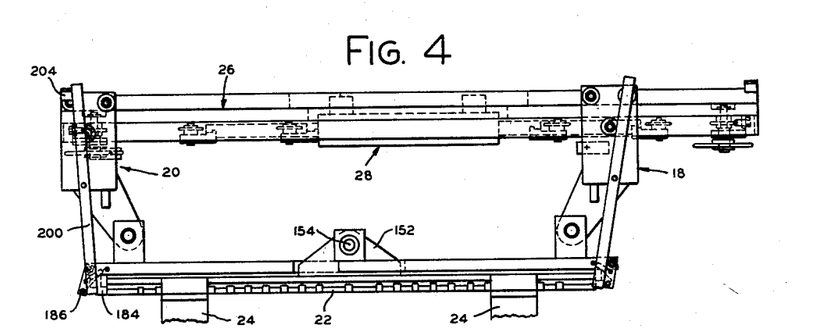
FIGURE 4 is similar to FIGURE 3 and shows my device in a forward load engaging position and fully shifted laterally to one side.
Figure 5:
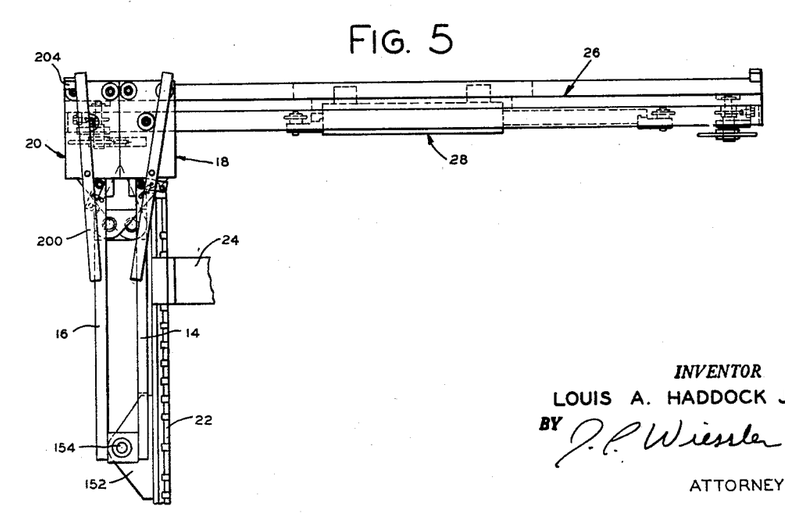
FIGURE 5 is also similar to FIGURE 3 and shows the device fully shifted to one side and located in a side load carrying position.

For example, if the truck is operating in a relatively narrow aisle with my device in its centered forwardly extending position (FIG. 3) and it is desired to engage a load at the left side of the vehicle, the truck operator first actuates piston and cylinder assemblies 28 and 30 to the left (see Phase J in FIG. 1 and FIG. 4) which shifts the guide members 18 and 20 with levers 14 and 16 and carriage 22 to the right (as viewed from the operator's station) along the guide track 26 to the position shown in FIGURE 4. It will be noted that stop member 204 has caused trip lever 200 to pivot in a clockwise direction, thereby unlatching latch means 12 by disengaging latch pin 186 from notch 185 in latch block 184. Continued actuation to the left of piston and cylinder assembly 28 causes only guide member 18 to continue to move to the right along guide track 26, passing through the intermediate position shown in FIGURE 2 and finally assuming the position shown in FIGURE 5 upon full actuation of piston and cylinder assembly 28 to the left. In this position (FIG. 5) guide members 18 and 20 are in abutment and together wtih levers 14 and 16 and carrier plate 22 form a forwardly extending boom relative to the truck with the fork tines 24 extending transversely toward the left of the vehicle. Simultaneous actuation of piston and cylinder assemblies 28 and 30 toward the right causes abutting guide members 18 and 20 to move together along guide track 26 toward the left end thereof so that the fork tines 24 extend outwardly from the side of the vehicle to engage a load. Reversal of the above-described operation actuates the fork tines 24 back to their centered and forwardly extending position. It will be appreciated that it is necessary to elevate slightly in the mast the attachment device in order to engage the load for movement with the fork tines 24. From the central and forwardly extending position, which is the normal load transporting position, it is possible to deposit the load to either side of the truck or at any angle therebetween, as will now be clearly understood. A similar, but reverse, sequence of operations is involved in engaging and redepositing a load at the right side of the vehicle.

It will be noted that when the device has been actuated to a side load engaging position, such as shown in Phase M, stop member 196 will engage the adjacent end of trip lever 192 causing it to rotate in a counterclockwise direction. This movement of trip lever 192, however, does not unlatch latch means 10 because pivotal movement of the hinge plate 14 to the side loading position has caused latch means 10 to be moved from its position in FIGURE 6 to its position in FIGURE 7 wherein latch pin 178 is now disposed beneath an elevated portion of trip lever 192. Latch pin 178 is therefore by-passed by the trip lever under these conditions and retains hinge plate 14 in latched relation to carriage 22. Latch means 12 is disposed, similarly relative to trip lever 200 when my device is in the position shown in Phase E. It will therefore be appreciated that the latching means 10 and 12 function upon side shifting of the fork carriage assembly (as in Phases B and J) to unlatch the carriage 22 from one of the hinge plates 14 and 16 as required to dispose the assembly in a side loading position (as in Phases D and L), but do not function to unlatch the latched side of carriage 22 during transverse movement thereof to engage a load at one side of the truck (as in Phases E and M).

As mentioned previously, if the device is located in a centered forwardly extending position (Phase A) and is approaching a load to be engaged which is located off-center of the longitudinal axis of the truck, the fork tines 24 can be side-shifted a limited distance (Phase B or J) to bring the fork tines 24 into correct alignment to engage the load. This is accomplished by simultaneously actuating piston and cylinder assemblies 28 and 30 to the right (as viewed from the operator's station) if it is desired to side shift to the left, whereby guide members 18 and 20 move to the left along guide means 26 in constant spaced apart relation and carry hinge plates 14 and 16 and carrier plate 22. A similar actuation of piston and cylinder assemblies 28 and 30 to the left results in a side shifting of fork tines 24 to the right.

Although only a single preferred embodiment of my invention has been disclosed herein, it will be apparent to persons skilled in the art that modifications and changes may be made in the construction form and arrangement of parts without departing from the scope of the invention.

I claim:

1. A load handling device for industrial vehicles including elongated guide means, a pair of longitudinally spaced guide members mounted on the guide means and actuatable in either direction therealong, means pivotal centrally thereof and pivotally connected at opposite ends to different ones of the guide members, load carrier means pivotally connected to said pivotal means centrally thereof and extending parallel of said guide means, means for latching the load carrier means to said pivotal means so that said load carrier means can be actuated longitudinally of the guide means while in parallel relation thereto and means for unlatching said latching means from one side of said load carrier means upon such parallel movement of said carrier means so that said load carrier means and pivotal means are actuatable into transverse relation to said guide means and longitudinally of said guide means when in such transverse relation thereto, said unlatching means including at least one stop member fixed to the said guide means and at least one trip lever pivotally connected to one of the said guide members and disposed to engage the said stop member upon a predetermined parallel movement of the said guide members.

2. In an attachment for industrial vehicles including elongated guide means, a pair of longitudinally spaced guide members mounted on the guide means and actuatable in either direction therealong, a pair of hinge plates pivotally joined together at adjacent ends thereof and pivotally joined at opposite ends to different ones of the guide members, load carrier means pivotally connected to the hinge plates at the pivotal connection therebetween, means for latching the load carrier means to the hinge plates, said latching means including a pair of latch blocks and a pair of pins which cooperate with said latch blocks to latch the load carrier means to said hinge plates, and means for unlatching said latching means including a pair of stop members secured to the guide means adjacent opposite ends thereof and a pair of trip levers pivotally mounted on the respective guide members adjacent said pins so that predetermined movement of said guide members along the guide means in one direction causes one of said trip levers to contact one of said stop members and pivot to disengage the adjacent pin from the adjacent latch block and predetermined movement of said guide members along the guide means in the opposite direction causes said other trip lever to contact said other stop member and to disengage the adjacent pin from the adjacent latch block.

3. An attachment as set forth in claim 2 wherein said guide members are actuatable into abutting relation following unlatching of one of said latch blocks and pins, the other latch block and pin pivoting to a new location out of operative relation to the adjacent trip lever.

4. In an attachment for industrial vehicles including elongated guide means, a pair of guide members mounted in longitudinally spaced relation on the guide means and actuatable longitudinally thereof in either direction, hinge means pivotally joined together at adjacent ends thereof and pivotally joined at opposite ends to different ones of the guide members, load carrier means connected to the hinge means at the adjacent ends thereof, means for latching the load carrier means to both sides of the hinge means so that the load carrier means extends parallel of the guide means, and means for unlatching said latching means from one side of said hinge means upon predetermined movement of the guide members toward one end of the guide means, said unlatching means including a stop member connected to said guide means and a lever pivotally connected to one of said guide members and disposed to contact said latching means and said stop member upon predetermined movement of said guide members toward one end of said guide means so that continued movement of said guide means causes pivotal movement of said lever which actuates said latching means to unlatch.

5. A load handling device for industrial vehicles including elongated guide means, a pair of guide members mounted on the guide means in spaced relation and actuatable longitudinally thereof in either direction, hinge means pivotally joined together at adjacent ends and pivotally joined at opposite ends to different ones of the guide members, load carrier means pivotally connected to the hinge means at the pivotally joined ends thereof, means for latching the load carrier means to the hinge means including a latch member secured to the load carrier means at each end thereof and cooperating members pivotally mounted at each end of the hinge plates for engaging the latch members, and means for unlatching said latching means including a pair of stop members secured to the guide means at each end portion thereof and a pair of lever arms pivotally mounted on the guide members and arranged so that predetermined movement of one of the guide members in one direction along the guide means causes one of said lever arms to contact one of said stop members and pivot to disengage the adjacent cooperating member from the one latch member, and predetermined movement of the other guide member in the opposite direction causes the other lever arm to contact the other stop member and pivot to disengage the adjacent cooperating member from the other latch member.

6. A load handling device for industrial vehicles comprising elongated guide means having a pair of longitudinally spaced apart stop members secured thereto and load supporting means mounted on said guide means and actuatable in either direction therealong, said load supporting means including a pair of longitudinally spaced apart guide members mounted on said guide means, means pivotal centrally thereof and pivotally connected at opposite ends to different ones of said guide members, load carrier means connected to said pivotal means centrally thereof and pivotal between a parallel and a transverse position relative to said guide means, means for latching said load carrier means to said pivotal means and a pair of levers pivotally connected respectively to different ones of said guide means and means cooperating with said stop members for unlatching said latching means when said load carrier means is located parallel to said guide means and is actuated along said guide means, said levers being rendered inoperative to unlatch said latching means upon actuation of said load supporting means along said guide means when said load carrier means is transverse of said guide means.

7. In an attachment for industrial vehicles including elongated guide means, a pair of guide members mounted in spaced relation on the guide means and actuatable longitudinally thereof in either direction, a pair of hinge plates pivotally joined together at adjacent ends thereof and pivotally joined at opposite ends to different ones of the guide members, load carrier means pivotally connected to the hinge plates at the pivotal connection therebetween, means for latching the load carrier means to the hinge plates, means for unlatching said latching means upon predetermined movement of the guide members in one direction along the guide means, said unlatching means including a pair of stop members connected to said guide means in spaced apart relation, a first lever pivotally connected to one of said guide members and disposed to contact one of said stop members and said latching means and a second lever pivotally connected to the other of said guide members and disposed to contact the other of said stop members and said latching means so that predetermined movement of said guide members in one direction actuates said unlatching means to unlatch said carrier means from one of said hinge plates and predetermined movement of said guide members in the opposite direction actuates the unaltching means to unlatch said carrier means from the other of said hinge plates actuating means connected to each guide member for actuating same along the guide means, said actuating means including first and second rotatable wheel means mounted in spaced relation on the guide means, flexible means reeved over said first and second wheel means and secured at its ends to one of said guide members, third and fourth wheel means mounted for rotation with said first and second wheel means respectively, a double-acting piston and cylinder fluid actuator having the cylinder secured longitudinally of the guide means and a pair of piston rods secured to the piston and extending from opposite ends of the cylinder, fifth and sixth wheel means rotatably mounted on said piston rods, and second flexible means secured at its opposite ends to opposite end portions of the guide means and reeved in succession over said fifth, third, fourth and sixth wheel means.

References Cited in the file of this patent
UNITED STATES PATENTS

| | | |
|---|---|---|
| 2,059,150 | Schroeder | Oct. 27, 1936 |
| 2,851,182 | Gerhring | Sept. 9, 1958 |
| 2,945,610 | Wendt | July 19, 1960 |
| 2,950,831 | Anzons | Aug. 30, 1960 |
| 2,987,205 | Draxler | June 6, 1961 |